United States Patent
Heismann et al.

(10) Patent No.: US 7,193,217 B2
(45) Date of Patent: Mar. 20, 2007

(54) X-RAY DETECTOR

(75) Inventors: Björn Heismann, Erlangen (DE); Thomas von der Haar, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 26 days.

(21) Appl. No.: 10/545,371

(22) PCT Filed: Feb. 2, 2004

(86) PCT No.: PCT/EP2004/000924

§ 371 (c)(1),
(2), (4) Date: Aug. 12, 2005

(87) PCT Pub. No.: WO2004/071299

PCT Pub. Date: Aug. 26, 2004

(65) Prior Publication Data

US 2006/0081785 A1    Apr. 20, 2006

(30) Foreign Application Priority Data

Feb. 14, 2003 (DE) .............................. 103 07 752

(51) Int. Cl.
*G01T 1/24* (2006.01)

(52) U.S. Cl. .............................................. 250/370.09
(58) Field of Classification Search ............ 250/370.09
See application file for complete search history.

(56) References Cited

U.S. PATENT DOCUMENTS

| | | | |
|---|---|---|---|
| 6,759,658 B2 | 7/2004 | Overdick et al. | |
| 6,792,068 B1 | 9/2004 | Flohr et al. | |
| 7,120,282 B2 * | 10/2006 | Langan | .................. 382/128 |
| 2002/0070365 A1 | 6/2002 | Karellas | |
| 2004/0096036 A1 * | 5/2004 | Yanoff et al. | .............. 378/98.8 |
| 2005/0105687 A1 | 5/2005 | Heismann et al. | |

FOREIGN PATENT DOCUMENTS

| | | |
|---|---|---|
| DE | 19502574 A1 | 8/1996 |
| DE | 19935093 A1 | 2/2001 |
| DE | 10106221 A1 | 8/2002 |
| DE | 10106221 B2 | 8/2002 |
| DE | 10212638 A1 | 10/2003 |
| EP | 0 714 038 A2 | 5/1996 |
| WO | WO 98/05980 | 2/1998 |

* cited by examiner

*Primary Examiner*—David Porta
*Assistant Examiner*—Marcus Taningco
(74) *Attorney, Agent, or Firm*—Harness, Dickey & Pierce, P.L.C.

(57) ABSTRACT

An x-ray detector includes a large number of pixels, each of the latter being configured from one or more sub-pixels. Each of the sub-pixels include a detector material for the direct conversion of incident X-ray radiation into an electric signal. A device for converting the electric signals into corresponding digital signals is associated with each of the sub-pixels and the detector is also equipped with a device for processing said digital signals into a combined digital signal representing the number and/or energy of the X-ray quanta that are incident on the pixel.

19 Claims, 3 Drawing Sheets

X-RAY DETECTOR

This application is the national phase under 35 U.S.C. § 371 of PCT International Application No. PCT/EP2004/000924 which has an International filing date of Feb. 2, 2004, which designated the United States of America and which claims priority on German Patent Application number DE 103 07 752.9 filed Feb. 14, 2003, the entire contents of which are hereby incorporated herein by reference.

FIELD

The invention generally relates to an X-ray detector. It relates in particular to an X-ray detector for radiographic examination appliances, such as computer tomography scanners or X-ray appliances for example, for mammography or for angiography for example.

BACKGROUND

The X-ray detectors in known radiographic examination appliances differ because of the different measurement requirements. The X-ray detectors are specifically adapted, in particular with regard to their spatial and time resolution, the detector area, the quantum efficiency and the read rate. Furthermore, in the case of a modular configuration of the known X-ray detectors, their detector modules in the various radiographic examination appliances are not interchangeable. The development, production and provision of detector modules specifically matched to the respective measurement requirements involve major complexity.

EP 0 819 406 A1 describes a computer tomography scanner. The detector in this case includes a plurality of parallel detector rows, which are each formed from detector elements arranged alongside one another. The detector rows may each include a plurality of detector modules. The proposed detector modules are specifically matched to the requirements of a detector for a computer tomography scanner. They are not universally suitable for production of other radiographic examination appliances.

A computer tomography scanner with a multirow detector is known from DE 199 35 093 A1. Each row includes a large number of detector elements arranged alongside one another. Each of the detector elements includes a scintillator ceramic and a downstream photodiode. In order to reduce the complexity of the electronics arranged downstream from the detector, the detector elements may be connected to the electronics, and disconnected, in groups.

DE 195 02 574 C2 discloses a computer tomography scanner, having an area detector which has N rows. Each of the rows includes M detector elements arranged alongside one another. In order to reduce the complexity of the area detector with regard to its reading, data rate and reconstruction to a feasible extent, the detector elements in a plurality of rows are connected together. The interconnected detector elements form a detector column. The interconnection results in addition of the analog output signals from the detector elements. The added output signals are digitized in downstream electronics, and are processed further to form image information.

A computer tomography scanner with an area detector is known from DE 196 00 115 C1. The area detector includes a large number of detector elements, which are in turn formed from a matrix of detector elements. In order to optimize the reading of the area detector with respect to the performance of downstream electronics, it is proposed that the detector elements in each detector element be read sequentially.

DE 101 06 221 A1 describes an X-ray detector, in which detector elements arranged like a matrix can be formed from a semiconductor material. Absorbed X-ray quanta are converted, as a result of their absorption, directly to an electrical charge signal whose magnitude is approximately proportional to the absorbed energy. In order to optimize the measurement over a wide dynamic range, it is proposed that a counting method and an integration method for the charge signals that are produced be carried out in parallel in an evaluation unit, which is connected downstream from the detector elements. The results of both methods are used jointly in a data processing unit, and are used to determine an overall result for the amount of absorbed X-ray radiation. The proposed detector can admittedly be designed in a modular form, but the modules are not universally suitable for production of different X-ray radiographic examination appliances.

SUMMARY

One object of at least one embodiment of the present invention is to improve upon or even overcome at least one of the disadvantages according to the prior art. One aim of at least one embodiment in particular is to provide a universal X-ray detector which is suitable for use as a component for production of different radiographic examination appliances.

At least one embodiment of the invention provides an X-ray detector having a plurality of pixels, with each of the pixels being formed from one or more subpixels, with each of the subpixels (9) having a detector material (1) for the direct conversion of incident X-ray radiation to electrical signals, with each of the subpixels having an associated device for conversion of the electrical signals to corresponding digital signals, with a device being provided for processing the digital signals to an overall digital signal which represents the number and/or the energy of the X-ray quanta striking the pixel, and with a correction device being provided for correction of an overall signal which is reduced as a consequence of a failure of one or more of the subpixels.

The correction device may be an appropriately programmed integrated circuit which compares the overall signal produced by one pixel with a predetermined overall signal. If any change is found, a change in the occupancy of the subpixels within that pixel can be initiated as a function of the predetermined program. However, it is also possible to correct or normalize the reduced overall signal in accordance with the measured difference.

The proposed X-ray detector is universal. The provision of a device for processing of the digital signals allows the size of the pixels and possibly the overall signal produced by addition of the digital signals of the subpixels to be matched to the respective measurement requirements. The proposed X-ray detector can be used equally well for X-ray computer tomography and for radiography.

In the context of at least one embodiment of the present invention, the expression a "pixel" means a subpixel or a group of subpixels. Each subpixel forms one X-ray detector element. Digital signals produced by a plurality of X-ray detector elements can be added by way of the device for processing in accordance with a predetermined program to produce an overall digital signal. If one pixel is formed by a group of subpixels, errors or faults resulting from defective subpixels can be identified and corrected. The function of the pixel is maintained despite a defect in one or more subpixels. The proposed X-ray detector is particularly reliable and has a particularly long life.

The overall digital signal is the signal of the pixel, and is used as such for production of an image point on a screen of a computer system, or of a print-out produced by it.

The expression an "electrical signal" means, in particular, an electrical charge signal. An electrical charge signal such as this is produced on absorption of X-ray quanta by way of directly converting materials, for example semiconductors such as GaAs, CdTe, CdZnTe or photoconductors such as Se, $PbI_2$ or PbO.

The device for processing expediently has a device for setting the number of subpixels which form one pixel, and/or for selection of the number of subpixels to be used per pixel for evaluation. The selection device(s) define the size and/or the arrangement of the subpixels which form one pixel. The selection means may be a fixed predetermined program. In this case, the number and/or the arrangement of the subpixels which form a pixel are selected in particular as a function of the required data transmission rate R, such that:

$$R = b*f*A/(c*d^2),$$

where
- b the bit depth,
- f the recording frequency in images per second,
- A the X-ray radiographic examination area,
- c the number of interconnected subpixels, and
- d the side length of the subpixels.

The value c defines the number of interconnected subpixels with a side length of d to form one pixel. The proposed X-ray detector is suitable not only for computer tomography but also for radiography. The data transmission rate R for an X-ray detector for computer tomography with a bit depth of b=16, a recording frequency of f=5 000 images/second, an X-ray radiographic examination area A of 500 $cm^2$ and a pixel size ($c*d^2$) of 1 $mm^2$ is 4 Gb/second. The data transmission rate R for a detector for X-ray radiography with a bit depth of B=14, a recording frequency of f=30 images/second, an X-ray radiographic examination area of A=40 $cm^2$ and a pixel size of ($c*d^2$)=100 $\mu m^2$ is 6.72 Gb/second. This shows that the X-ray detector according to at least one embodiment of the invention can cover a wide range of measurement requirements.

According to a further refinement feature of at least one embodiment, a correction device is provided for correction of an overall signal which is reduced as a consequence of a failure of one or more of the subpixels. This may be an appropriately programmed integrated circuit which compares the overall signal produced by one pixel with a predetermined overall signal. If any change is found, a change in the occupancy of the subpixels within that pixel can be initiated as a function of the predetermined program. However, it is also possible to correct or normalize the reduced overall signal in accordance with the measured difference.

The correction device according to one variant of at least one embodiment of the invention expediently has a comparator for comparison of an overall signal which is produced during bombardment with a known X-ray intensity, with a predetermined overall signal or a maximum value of the overall signal of further pixels. For the purpose of correction, the correction device may also have a means for changing the selection of the subpixels used for measurement of the overall signal.

According to one further refinement of at least one embodiment, the detector material is cadmium telluride, cadmium-zinc telluride, or mercury iodide. Mixtures of these substances with one another or with other substances are also possible. The detector material expediently has a thickness which guarantees the necessary dosage quantum efficiency (DQE) for the intended measurement purposes. In the case of an X-ray detector for computer tomography, the required DQE of >90% is achieved with a thickness of 1.4 mm of cadmium telluride. The thickness of the detector material should expediently be chosen such that the detector elements can be used equally well for different measurement purposes.

According to one further refinement feature of at least one embodiment, a predetermined number of pixels and the devices associated with their subpixels are designed for implementation as an interchangeable detectormodule. A detector module such as this is equally suitable for the production of a detector, for example for X-ray computer tomography and for X-ray radiographic appliances. In this context, it is advantageous for the device for processing and/or the correction device to be a component of the detector module.

BRIEF DESCRIPTION OF THE DRAWINGS

The invention will be explained in more detail in the following text with reference to the drawing, in which.

DETAILED DESCRIPTION OF THE EXAMPLE EMBODIMENTS

Figure 1:
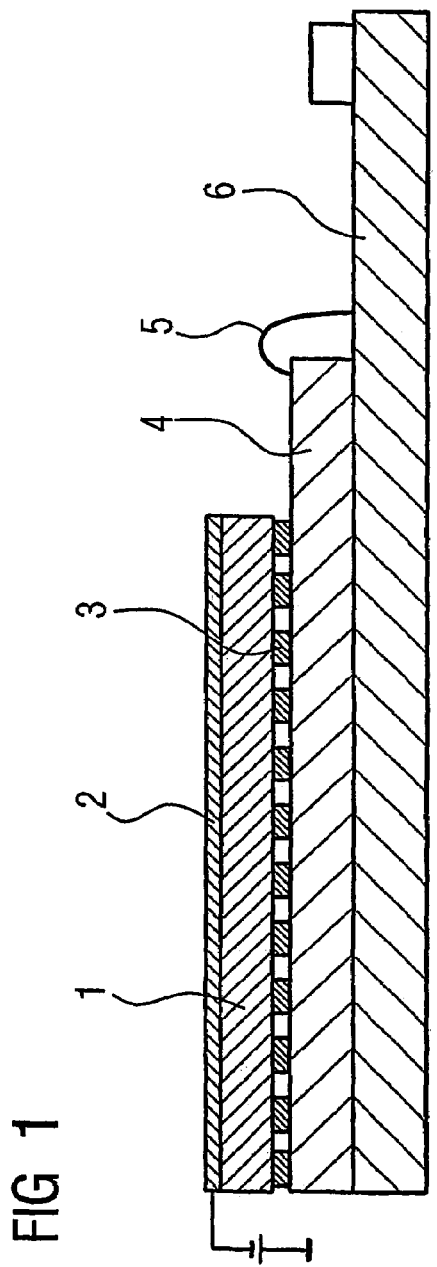
FIG. 1 shows the schematic configuration of a first detector element.

FIG. 1 shows, schematically, a first detector element. A first electrode 2 which faces a beam source (not shown here) is fitted to a direct transducer layer 1 (for example Cd(Zn)Te) which is formed from a material for direct conversion of the energy of absorbed X-ray quanta to an electrical charge signal. A structured second electrode 3, which makes contact with CMOS counting electronics 4, is located on the side of the direct transducer layer 1 facing away from the beam source. The CMOS counting electronics 4 are electrically connected via bonding contacts 5 to conductor tracks (not shown here) on a mount substrate 6.

Figure 2:
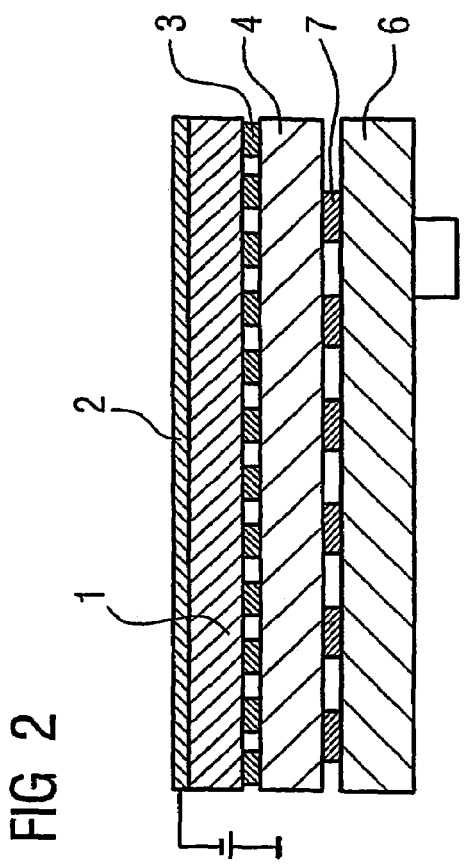
FIG. 2 shows the schematic configuration of a second detector element.

The second detector element, which is shown in FIG. 2, is configured similarly to the first detector element, shown in FIG. 1. In this case, the CMOS counting electronics 4 are connected to the mount substrate 6 via ball-grid contacts 7 ("plated-through").

Figure 3:
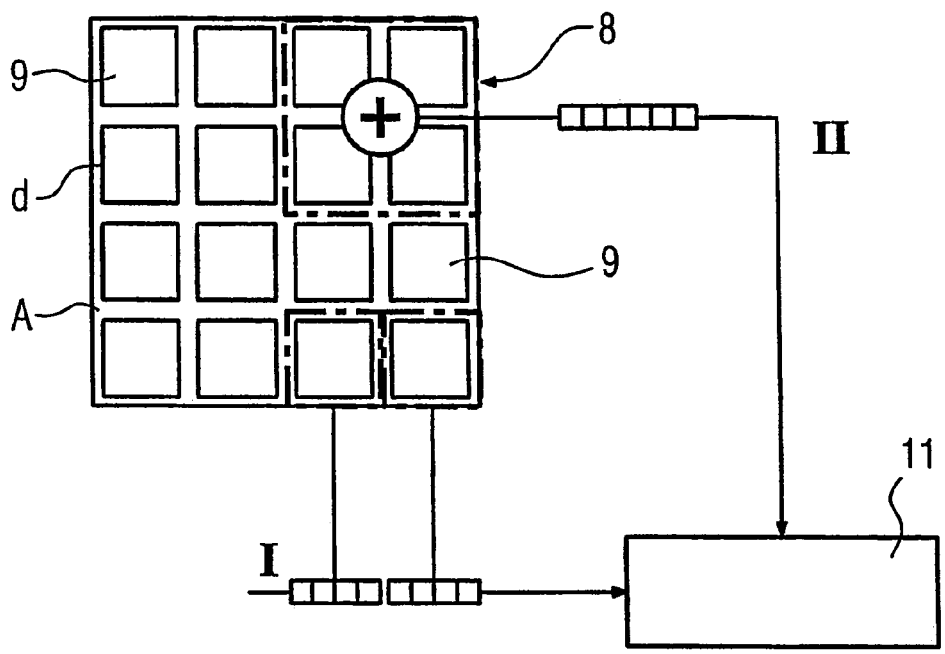
FIG. 3 shows the schematic configuration of a detector module in a first circuit.
Figure 4:
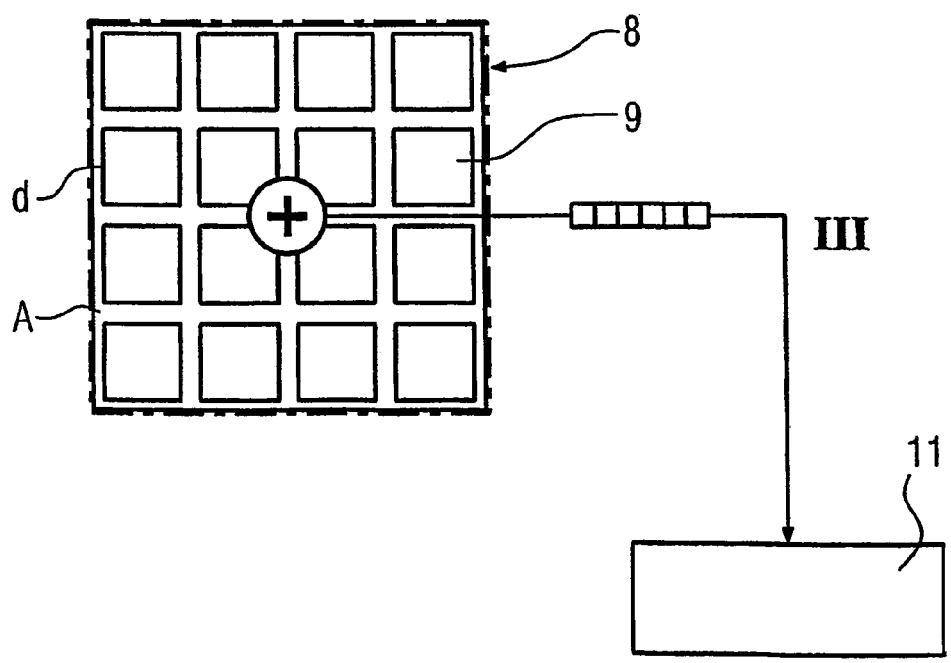
FIG. 4 shows the schematic configuration of a detector module as shown in FIG. 3, in a second circuit.

The plan views in FIGS. 3 and 4 show an X-ray detector module 8 with a plurality of circuit variants I, II, III. The X-ray detector module 8 with a detector surface or sensor surface A is in each case composed of 16 detector elements. Each of the detector elements forms a square subpixel 9 with an edge length of d.

In the simplest case, which is illustrated as the circuit variant I in FIG. 3, each pixel is formed from just one subpixel 9 (binning c=1, with 16 pixels to be transmitted with a bit length of b=4). A digital output is annotated with the reference symbol 11. The digital signal produced by each detector element is in this case interpreted and processed further as an overall signal for that pixel.

The device for processing the digital signals may be a special device arranged downstream from the CMOS cell electronics. The device may, however, also be combined with the CMOS cell electronics 4 in a single component. It is particularly advantageous for the device for processing the digital signals to be programmable. In this case, it is possible to produce X-ray detectors according to the invention in one and the same hardware configuration. Depending on the measurement requirement, the X-ray detector can then be configured appropriately by means of the device for processing the digital signals. The device for processing may, for example, be programmed in order to achieve a high resolution, such that each subpixel forms one pixel.

In the alternative circuit variant II, which is likewise shown in FIG. 3, one pixel is composed of four interconnected subpixels 9 (binning c=4). The X-ray detector module 8 in this case thus has four pixels. Each of the pixels transmits a bit length of b=6. The digital signals produced by the detector elements are added by way of the device for processing the digital signals in a counter with a bit length of b=6, and are processed further as the overall signal for that pixel. If one subpixel 9 is defective, then this can be corrected as a gain discrepancy. The "binning" is in each case indicated by a dashed line in the figures.

In the circuit variant III shown in FIG. 4, the X-ray detector module 8 overall forms only one pixel (binning c=16). In this case, all sixteen subpixels 9 are interconnected. Only one pixel need be transmitted. In this case, the transmitted bit length is b=8.

Subpixels with an edge length in the range from 50 to 200 µm, preferably 100 µm, should expediently be provided for the specific embodiment of an X-ray detector module 8 which is suitable, for example, for X-ray computer tomography and other applications. 100 subpixels are interconnected in order to produce a pixel with a pixel size of 1 mm$^2$ with an edge length of 100 µm. The overall size of the X-ray detector module is, for example, in the region of an edge length of a few centimeters, for example 5×2 cm$^2$. A module such as this includes 100 000 subpixels, corresponding to 1 000 pixels with an edge length of 1 mm. In this case, the failure of a single subpixel 9 would result in a gain error in the order of magnitude of 1%, which can be compensated for without any loss of image quality.

The proposed X-ray detector module 8 is particularly advantageous and universal when the CMOS counting electronics are programmable. In this case, the size and number of the interconnected subpixels 9 can be set by means of programming. The X-ray detector module 8 can thus easily be matched to the respective measurement purpose.

Figure 5:
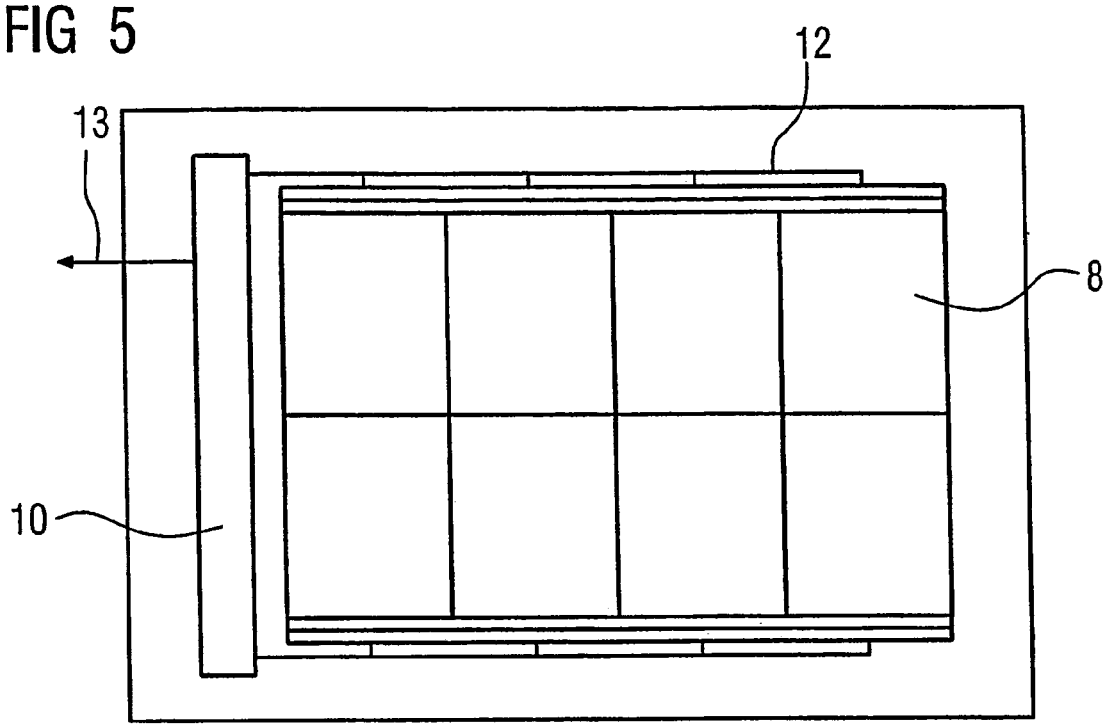
FIG. 5 shows an X-ray area detector with first modules.
Figure 6:
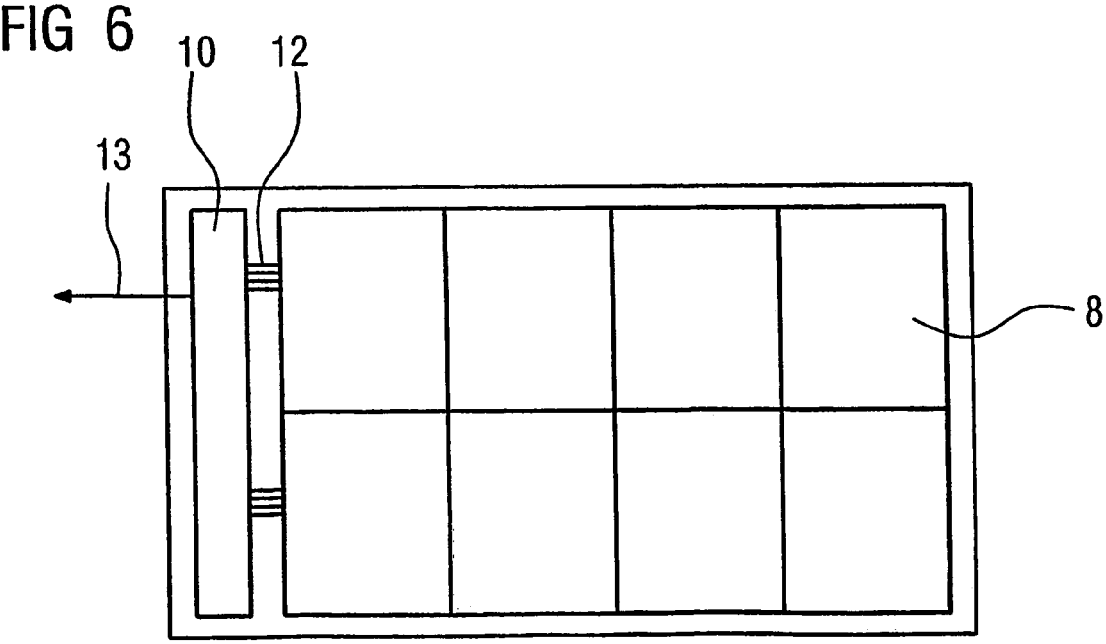
FIG. 6 shows an X-ray area detector with second modules.

FIGS. 5 and 6 show, schematically, the arrangement of a plurality of modules or X-ray detector modules 8 in order to form an X-ray area detector. In the example embodiment shown in FIG. 5, the connections of the X-ray detector modules 8 are passed out at the side, in particular on the longitudinal face of the X-ray area detector, and are combined to form lines 12 (power-in and data I/O lines), which lead to a digital controller 10, whose data output is annotated 13.

In the further example embodiment shown in FIG. 6, contact is made with the X-ray detector modules 8 on their rear face, and they are connected to the digital controller 10 by way of the lines 12 (power-in and data I/O lines).

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. An X-ray detector, comprising:
   a plurality of pixels, each formed from one or more subpixels, each of the subpixels including a detector material for direct conversion of incident X-ray radiation to electrical signals and including an associated device for conversion of the electrical signals to corresponding digital signals;
   a device to process the digital signals to an overall digital signal which represents at least one of a number and energy of X-ray quanta striking the pixel; and
   a correction device to correct an overall signal which is reduced as a consequence of a failure of one or more of the subpixels.

2. The X-ray detector as claimed in claim 1, wherein the device to process includes means for at least one of setting the number of subpixels which form one pixel, and for selection of the number of subpixels to be used per pixel for evaluation.

3. The X-ray detector as claimed in claim 1, wherein the correction device includes a comparator for comparison of an overall signal produced during bombardment with a known X-ray intensity, with at least one of a predetermined overall signal and a maximum value of the overall signal of further pixels.

4. The X-ray detector as claimed in claim 1, wherein the correction device includes means for changing the selection of the subpixels used for measurement of the overall signal.

5. The X-ray detector as claimed in claim 1, wherein the detector material is at least one of cadmium telluride, cadmium-zinc telluride, and mercury iodide.

6. The X-ray detector as claimed in claim 1, wherein a predetermined number of pixels and the devices associated with their subpixels are designed for implementation as an interchangeable detector module.

7. The X-ray detector as claimed in claim 6, wherein the device for processing is a component of the detector module.

8. The X-ray detector as claimed in claim 6, wherein the correction device is a component of the detector module.

9. The X-ray detector as claimed in claim 2, wherein the correction device includes a comparator for comparison of an overall signal produced during bombardment with a known X-ray intensity, with at least one of a predetermined overall signal and a maximum value of the overall signal of further pixels.

10. The X-ray detector as claimed in claim 2, wherein the correction device includes means for changing the selection of the subpixels used for measurement of the overall signal.

11. The X-ray detector as claimed in claim 2, wherein the detector material is at least one of cadmium telluride, cadmium-zinc telluride, and mercury iodide.

12. The X-ray detector as claimed in claim 2, wherein a predetermined number of pixels and the devices associated with their subpixels are designed for implementation as an interchangeable detector module.

13. The X-ray detector as claimed in claim 7, wherein the correction device is a component of the detector module.

14. An X-ray detector, comprising:
   a plurality of pixels, each formed from one or more subpixels, each of the subpixels including a material for direct conversion of incident X-ray radiation to electrical signals and including means for conversion of the electrical signals to corresponding digital signals;

means for processing the digital signals to an overall digital signal which represents at least one of a number and energy of X-ray quanta striking the pixel; and means for correcting an overall signal which is reduced as a consequence of a failure of one or more of the subpixels.

15. The X-ray detector as claimed in claim 14, wherein the means for processing includes means for at least one of setting the number of subpixels which form one pixel, and for selection of the number of subpixels to be used per pixel for evaluation.

16. The X-ray detector as claimed in claim 14, wherein the means for correcting includes a comparator for comparison of an overall signal produced during bombardment with a known X-ray intensity, with at least one of a predetermined overall signal and a maximum value of the overall signal of further pixels.

17. The X-ray detector as claimed in claim 14, wherein the means for correcting includes means for changing the selection of the subpixels used for measurement of the overall signal.

18. The X-ray detector as claimed in claim 14, wherein the material is at least one of cadmium telluride, cadmium-zinc telluride, and mercury iodide.

19. The X-ray detector as claimed in claim 14, wherein a predetermined number of pixels and the devices associated with their subpixels are designed for implementation as an interchangeable detector module.

* * * * *